(12) United States Patent
Sprague (10) Patent No.: US 8,743,077 B1
(45) Date of Patent: Jun. 3, 2014

(54) FRONT LIGHT SYSTEM FOR REFLECTIVE DISPLAYS

(75) Inventor: Robert A. Sprague, Saratoga, CA (US)

(73) Assignee: SiPix Imaging, Inc., Fremont, CA (US)

( * ) Notice: Subject to any disclaimer, the term of this patent is extended or adjusted under 35 U.S.C. 154(b) by 276 days.

(21) Appl. No.: 12/182,024

(22) Filed: Jul. 29, 2008

Related U.S. Application Data (60) Provisional application No. 60/953,410, filed on Aug. 1, 2007.

(51) Int. Cl.
*G06F 3/041* (2006.01)

(52) U.S. Cl.
USPC .......... 345/174; 362/84; 362/555; 362/23.07; 362/23.1; 362/23.13; 362/23.14; 362/23.2; 362/603; 362/612; 362/613; 345/1.1; 345/4; 345/5; 345/76; 345/77; 345/78; 345/79; 345/80; 345/81; 345/82; 345/83; 345/168; 345/169; 345/170; 345/171; 345/172; 345/173; 345/176; 455/186.2; 455/566; 715/731

(58) Field of Classification Search
USPC ............... 362/84, 85, 97.1–97.4, 555, 23.07, 362/23.1, 23.13, 23.14, 23.2, 603, 612, 613, 362/615; 455/186.2, 566; 345/1.1, 1.2, 4, 5, 345/173, 176, 76–83, 168–172, 174; 715/731
See application file for complete search history.

(56) References Cited

U.S. PATENT DOCUMENTS

| | | | |
|---|---|---|---|
| 5,796,509 A * | 8/1998 | Doany et al. .................. 359/254 |
| 5,847,690 A * | 12/1998 | Boie et al. .................... 345/104 |
| 5,930,026 A | 7/1999 | Jacobson et al. |
| 5,961,804 A | 10/1999 | Jacobson et al. |
| 6,013,538 A * | 1/2000 | Burrows et al. ................. 438/22 |
| 6,704,004 B1 * | 3/2004 | Ostergård et al. ............. 345/170 |
| 6,930,818 B1 | 8/2005 | Liang et al. |
| 6,947,017 B1 * | 9/2005 | Gettemy ......................... 345/63 |
| 7,102,162 B2 * | 9/2006 | Mai ................................. 257/59 |
| 7,301,273 B2 * | 11/2007 | Dedene et al. ................ 313/500 |
| 7,514,859 B2 * | 4/2009 | Naberhuis et al. ............ 313/501 |
| 7,629,400 B2 * | 12/2009 | Hyman ......................... 524/106 |
| 7,811,170 B2 * | 10/2010 | Winans et al. ................. 463/31 |
| 7,830,368 B2 * | 11/2010 | Marttila et al. .............. 345/175 |
| 7,917,034 B2 * | 3/2011 | Yu et al. ........................ 398/115 |
| 7,924,272 B2 * | 4/2011 | Boer et al. .................... 345/175 |
| 8,025,434 B2 * | 9/2011 | Ahlgren et al. .............. 362/613 |
| 8,130,202 B2 * | 3/2012 | Levine et al. ................. 345/173 |
| 8,477,125 B2 * | 7/2013 | Park et al. .................... 345/207 |
| 2001/0048379 A1 * | 12/2001 | Kaikuranta et al. ........... 341/22 |
| 2002/0130832 A1 * | 9/2002 | Baucom et al. .............. 345/107 |
| 2003/0020084 A1 * | 1/2003 | Fan et al. ....................... 257/92 |
| 2003/0121981 A1 * | 7/2003 | Slutsky et al. ........... 235/462.45 |
| 2004/0141106 A1 * | 7/2004 | Wu et al. ........................ 349/69 |
| 2004/0263045 A1 * | 12/2004 | Smith et al. .................. 313/373 |
| 2004/0266515 A1 * | 12/2004 | Gauselmann .................. 463/20 |

(Continued)

*Primary Examiner* — Mary McManmon (74) *Attorney, Agent, or Firm* — Perkins Coie LLP (57) ABSTRACT

The present invention relates to a front light system which can be built with thin film light emitting diodes (LEDs), such as organic light emitting diodes (OLEDs) or electro-luminescent light emitting diodes. The front light system may be built on a thin and flexible substrate and can generate lighting of satisfactory uniformity and with high efficiency. The system also can potentially be inexpensive. The front light system of the present invention is particularly suitable for keymat applications wherein a flexible reflective display on top of a touch sensitive surface or device, is used as an output device.

6 Claims, 10 Drawing Sheets

(56) References Cited

U.S. PATENT DOCUMENTS

| | | | |
|---|---|---|---|
| 2005/0001541 A1* | 1/2005 | Yamazaki et al. | 313/503 |
| 2005/0073823 A1* | 4/2005 | Engelmann et al. | 362/23 |
| 2005/0083592 A1* | 4/2005 | Amitai et al. | 359/833 |
| 2005/0112403 A1* | 5/2005 | Ju et al. | 428/690 |
| 2005/0134189 A1* | 6/2005 | Osame et al. | 315/169.1 |
| 2005/0206828 A1* | 9/2005 | Lee et al. | 349/149 |
| 2006/0034065 A1* | 2/2006 | Thurk | 362/84 |
| 2006/0071233 A1* | 4/2006 | Cho et al. | 257/103 |
| 2007/0152983 A1* | 7/2007 | McKillop et al. | 345/173 |
| 2007/0252818 A1* | 11/2007 | Zlotnicki | 345/169 |
| 2007/0257821 A1* | 11/2007 | Son et al. | 341/22 |
| 2007/0279852 A1* | 12/2007 | Daniel et al. | 361/683 |
| 2008/0234044 A1* | 9/2008 | Aida | 463/37 |
| 2008/0259057 A1* | 10/2008 | Brons | 345/184 |
| 2009/0134986 A1* | 5/2009 | Bauer et al. | 340/426.23 |

* cited by examiner

FRONT LIGHT SYSTEM FOR REFLECTIVE DISPLAYS

This application claims priority to U.S. provisional application No. 60/953,410, filed Aug. 1, 2007; the content of which is incorporated herein by reference in its entirety.

BACKGROUND

Reflective displays require a front light system to facilitate viewing of images displayed. The front lighting for reflective displays normally consists of a light guide film attached to the front surface of the display. This light guide film has an illumination source placed at the edge of the light guide film and the light is guided within the film by total internal reflection of the surface along the light guide film, so that the light crosses the front of the display. Part of the surface of the light guide has a light scattering structure which causes light inside the light guide film to be scattered out of the film to strike the display surface. Such a system usually has a slightly rough surface which may be the display itself that is index matched to the light guide film, or has an array of microprisms specifically designed for this purpose. The display illuminated by the scattered light is viewed by looking through the light guide film.

Such a front lighting system has many disadvantages. First, since the light is strongest at the point of entry into the light guide film, the light tends to fall off in intensity rapidly at points which are further from the illuminating source. To compensate for this, a very complicated light prism structure may be utilized. This light prism structure may have different amounts of scattering near the source and at the points away from the source. Although such a system provides some degree of improvement in lighting uniformity, the uniformity, however, is still unsatisfactory, and the system must be customized for every application. Secondly, since this lighting system is based on scattering phenomenon, any scratch or piece of dirt in the light guide film also scatters the light which shows up as defects. As a result, it is very difficult for such a system to function properly. In addition, if a flexible front light is required, the front light system must be very thin; but a thin front light guide film exacerbates non-uniformity of the light along the length of the light guide film as described above.

SUMMARY OF THE INVENTION

The present invention is directed to a front light system for reflective displays.

The first aspect of the invention is directed to a front light system for a reflective display, which system comprises (a) one or more light emitting sources each of which is sandwiched between a cathode and an anode; and (b) optionally a light shield film on each of the light emitting sources.

The front light system may be built on a thin and flexible substrate and can generate lighting of satisfactory uniformity and with high efficiency (leading to low power requirement). The system also can potentially be inexpensive. The front light system of the present invention is particularly suitable for keymat applications wherein a flexible reflective display on top of a touch sensitive surface or device, is used as an output device.

Accordingly, the second aspect of the present invention is directed to a keymat assembly wherein said assembly comprises (a) touch sensitive keys; (b) a reflective display which is overlaid on said touch sensitive keys; and (c) a front light system and the front light system comprises (i) one or more light emitting sources each of which is sandwiched between a cathode and an anode; and (ii) transparent areas to allow the images displayed on said touch sensitive keys to be seen through the transparent areas. The light emitting sources may comprise a light shield film. The keymat assembly may be used in an electronic device such as a cell phone.

The front light system which can be built with any thin film light emitting materials, such as light emitting diodes (LEDs), in particular organic light emitting diodes (OLEDs), or electro-luminescent light emitting diodes. The cathode and anode in the front light system may be arranged in a row and column fashion, or in parallel, or in form of layers. In addition, the light emitting sources may be an electroluminescent layer.

BRIEF DESCRIPTION OF THE DRAWINGS

It is noted that the figures are not to scale and some of the features in the figures are exaggerated for clarity.

DETAILED DESCRIPTION OF THE INVENTION

Figure 1:
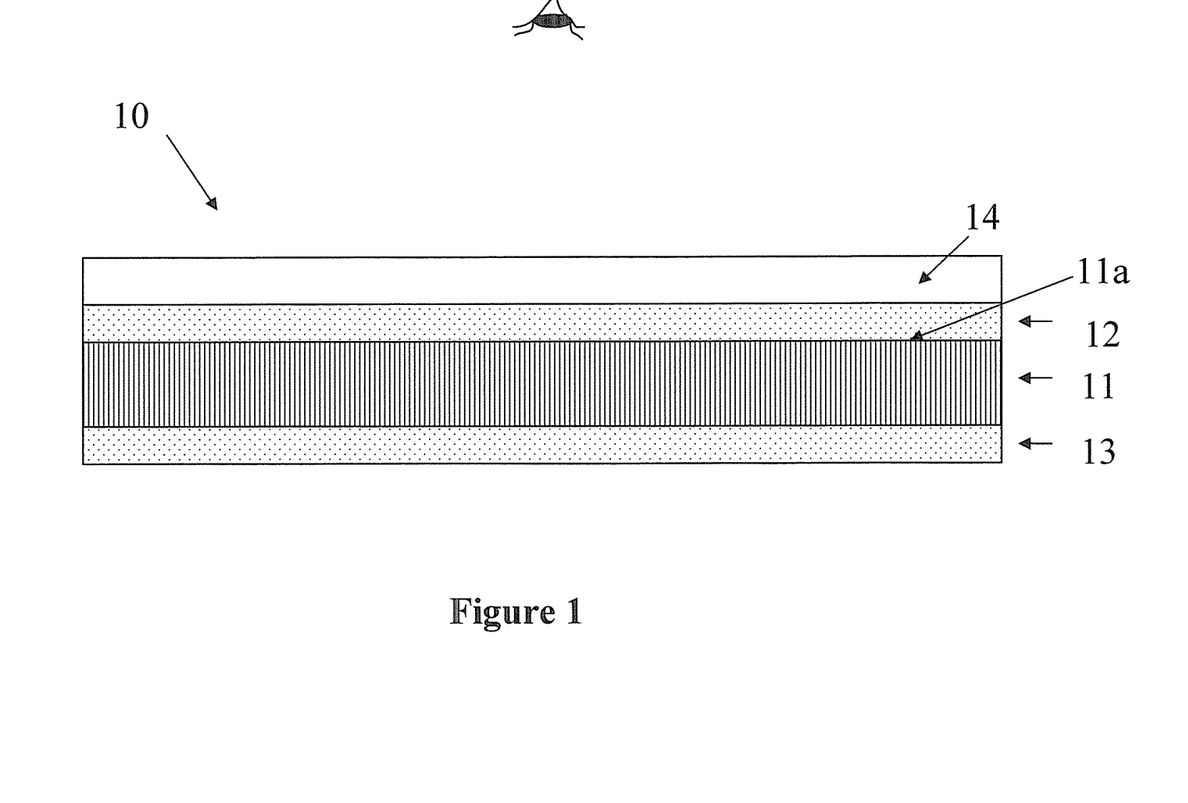
FIG. 1 is a cross-section view of a reflective display.

FIG. 1 is a cross-section view of a reflective display (10). The display comprises a display film (11) sandwiched between a first electrode layer (12) and a second electrode layer (13). One of the electrode layers (12 or 13) is transparent for viewing. In FIG. 1, the side of electrode layer 12 is the viewing side.

When the electrode layer is transparent, the electrode layer is usually formed from ITO (indium tin oxide). A front light film (14) of the present invention is formed or laminated over the viewing surface of the reflective display (10).

In a passive matrix display, the electrode layers (12 and 13) may be electrode layers having conductive lines formed thereon.

In a direct drive display, one of the electrode layers is a common electrode layer and the other electrode layer is a backplane comprising segmented electrodes or pixellated electrodes. In other words, the display film (11) is sandwiched between a common electrode layer and a backplane. The common electrode layer is usually the viewing side. The backplane may be formed from a flexible or rigid printed circuit board.

In an active matrix display, the display film (11) is sandwiched between a common electrode layer and a backplane which is thin-film-transistor based.

The display film (11) usually comprises an array of display cells filled with a display fluid. In one embodiment, the display film is an electrophoretic display film wherein display cells are filled with an electrophoretic fluid which comprises charged pigment particles dispersed in a dielectric solvent or solvent mixture. In another embodiment, the display film may be a liquid crystal display film wherein display cells are filled with a liquid crystal composition. In a further embodiment, the display film may be a liquid powder display film wherein display cells are filled with a gas and a dispersion of dry particles. In yet a further embodiment, the display cells may be filled with an electrochromic display material. In yet another embodiment, the display may consist of a pixellated reflective micromirror display elements or micro-light switches. In a further embodiment, the display may consist of an array of electrowetting cells. In the context of the present invention, the display film broadly encompasses all of the reflective display films which are defined as a display film that uses a reflective surface instead of backlighting to illuminate the display.

The display cells in the display film may be microcup-based (as described, for example, in U.S. Pat. No. 6,930,818), microcapsule-based (as described, for example, in U.S. Pat. Nos. 5,961,804 and 5,930,026), display cells with spacers as partition walls or any other types of reflective display devices.

The front light film (14) comprises a layer comprising one or more thin film illumination sources. The illumination sources are formed from a LED (light emitting diode) material, such as organic LEDs (OLEDs). The emitting material can be a small organic molecule in a crystalline phase or a polymer. Polymer material can be flexible; such LEDs are known as PLEDs (polymer LEDs). Compared with regular LEDs, OLEDs are lighter and polymer LEDs can have the added benefit of being flexible. PLEDs involve an electroluminescent conductive polymer that emits light when subject to an electric current. Typical polymers used in PLEDs include derivatives of poly(p-phenylene vinylene) and poly (fluorine). Substitution of side chains onto the polymer backbone may determine the color of emitted light or the stability and solubility of the polymer for performance and ease of processing. The OLED material may be applied to a surface using a printing process.

While OLEDs are specifically mentioned, it is understood that any of comparable light emitting materials may be used to build the front light film of the present invention. Such suitable materials may include, but are not limited to, organic or inorganic LEDs, electroluminescent emitters, UV phosphors and the like.

Figure 2:
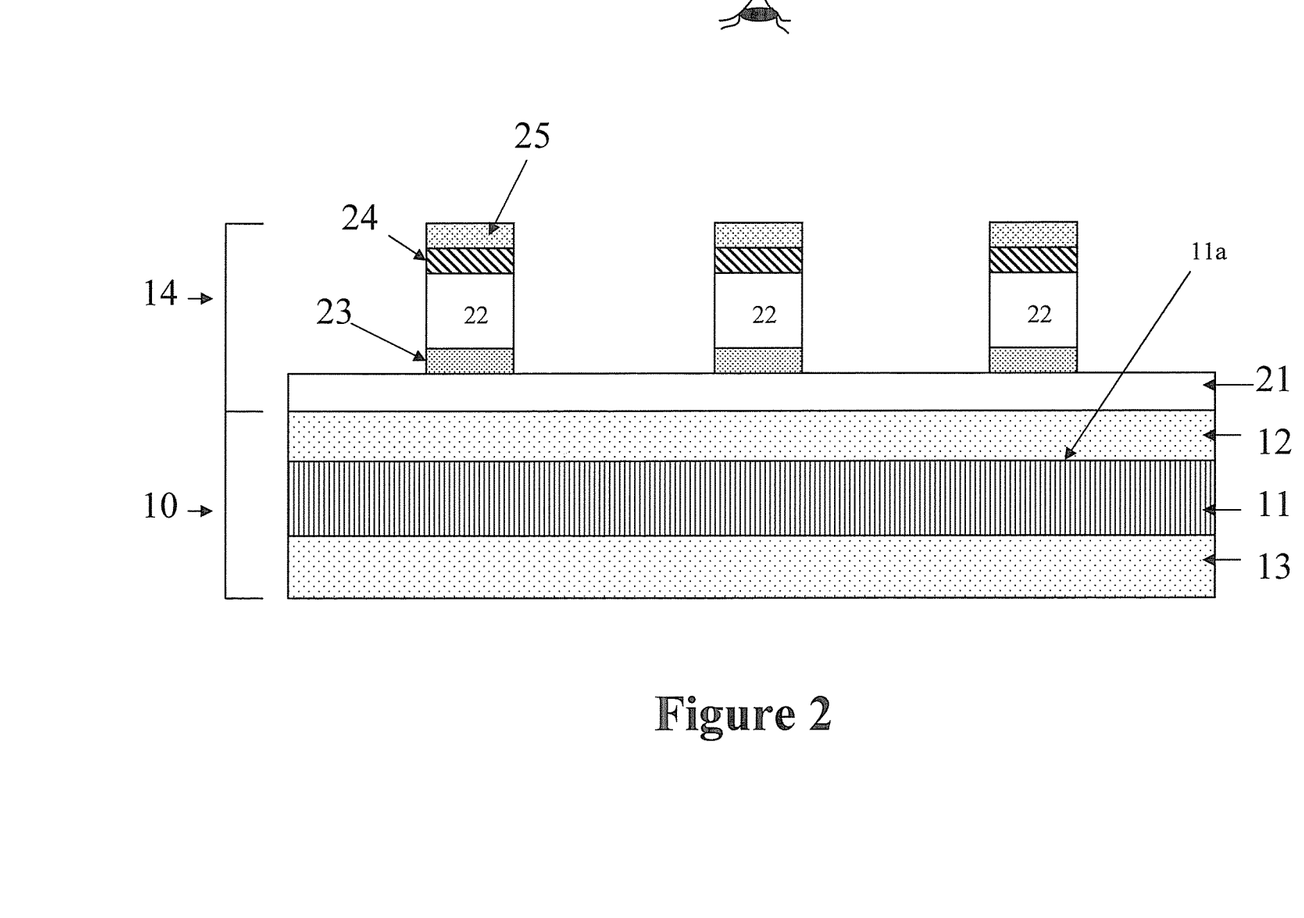
FIG. 2 depicts one embodiment of the front light system of the present invention which is on the top surface of a reflective display.

FIG. 2 depicts one embodiment of the front light system of the present invention which is on the top surface of a reflective display (10) as shown in FIG. 1. As shown in FIG. 1, the top surface (i.e., the side of electrode layer 12) of the reflective display (10) is the viewing side. The term "a front light system" is intended to indicate a lighting system which is on the viewing side of a reflective display. FIG. 2 is a cross-section view of the system. The system is built on a substrate layer (21). The substrate layer is transparent and may be a rigid film or a flexible film. A flexible substrate may be formed from a material, such as PMMA, PET or the like. The thickness of the substrate layer (21) is preferably in the range of 50 to 150 microns for a flexible display application; but may be thicker for a non-flexible display application.

Figure 8:
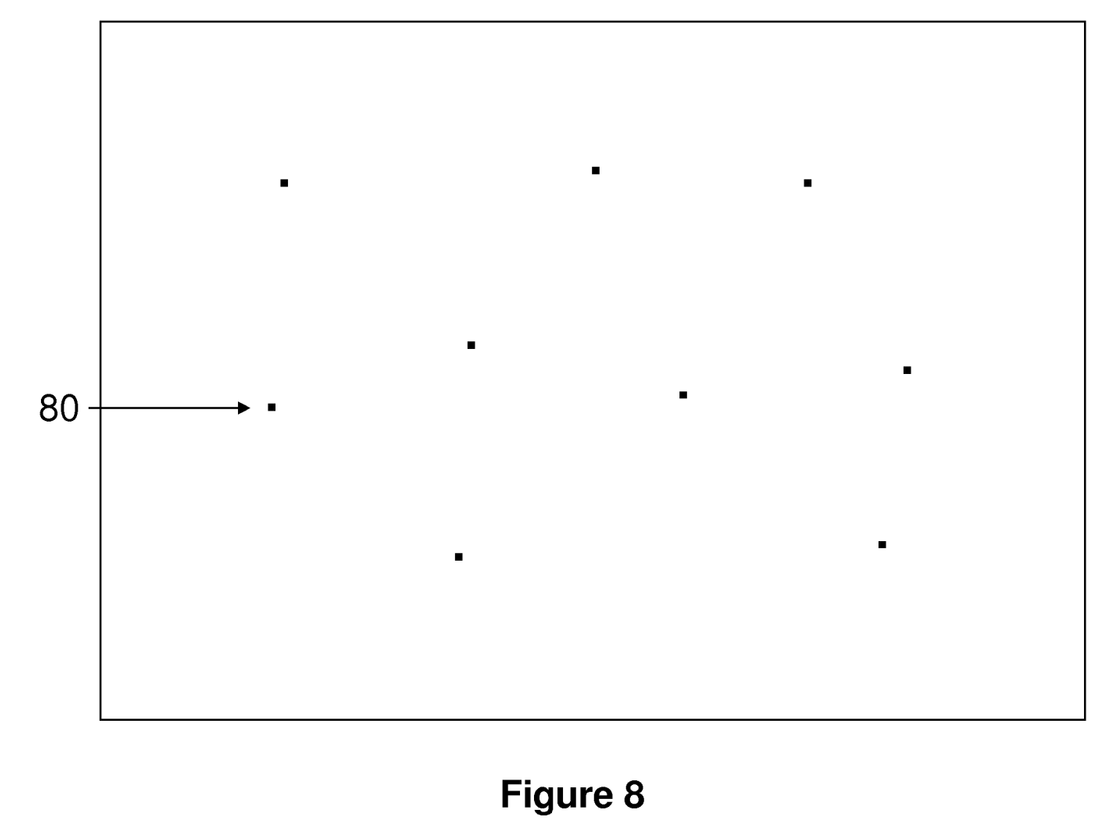
FIG. 8 depicts a top view of light emitting sources on the substrate layer of a display.

The OLED light source (22) in the form of small dots (80) is scattered throughout the surface of the substrate layer (see FIG. 8). The dots can be of any shape and spacing, and their sizes are in the range of 5 to 50 microns, preferably in the range of 5 to 20 microns.

Each of the light sources is sandwiched between two electrodes (23 and 24), one cathode and one anode. The electrodes (23) between the OLED light sources (22) and the substrate layer (21) are transparent. The electrodes (24) on top of the OLED light sources (22) may be transparent or non-transparent. The configurations of the electrodes may vary and they are described in sections below. The cathode and anode electrodes enable driving of an OLED light source to emit light. The emitted light shines directly onto the reflective surface (11a) of the display film (11) of FIG. 1 and is then reflected and scattered by the reflective surface. The display is viewed by an observer looking through the transparent substrate layer (21) in the areas where there are no OLED dots. The area of non-transparency due to the OLED structure (including the OLED dots and their associated elements) is kept to a small fraction of the total area so that the viewing of the display is not obstructed. For example, the total area of OLEDs may be 20×20 microns in size and they are on a surface space of 250×250 microns. In this case, more than 99% of the display area is not covered by OLEDs (see FIG. 8). The OLED light sources can be printed onto, and appear as a thin film layer on, a surface.

Over the electrode (24) on top of an OLED light source (22), there may be a reflective light shield film (25) to block the light from directly reaching the observer, if the electrode (24) is transparent. The purpose of the light shield is not only to block the light from directly shining into the observer's eyes, but also to reflect the upwardly emitted light back onto the display surface, hence achieving certain light gain. The light shield film may be formed from a material such as aluminum or silver.

If the electrode (24) is non-transparent, the electrode may serve as a light shield layer. In this case, no additional light shield film is needed.

Figure 3A:
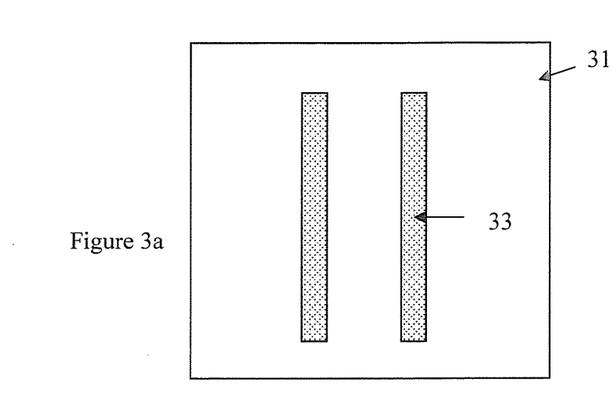
FIGS. 3a-3d show how a front light system is built in sequence.
Figure 3B:
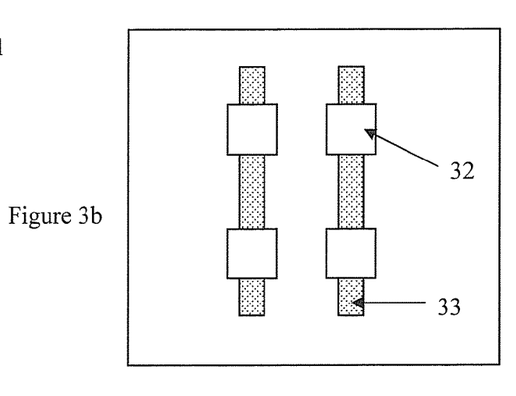
Figure 3C:
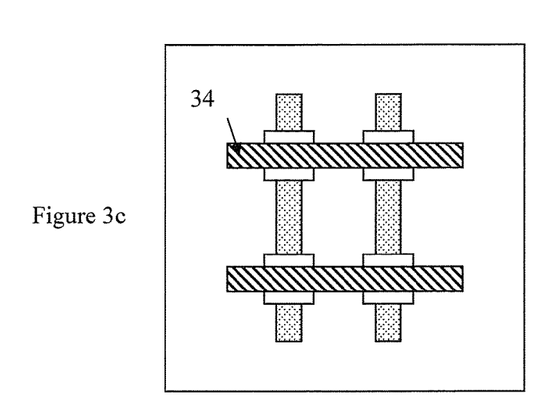
Figure 3D:
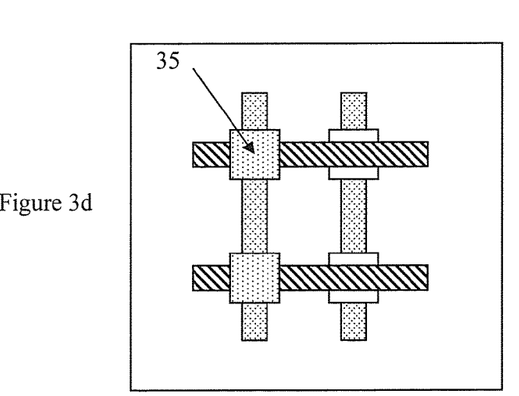

The configurations of the electrodes may vary in a number of ways. FIG. 3d provides a top view of a design in which the cathode and anode electrodes are arranged in a column and row fashion. FIGS. 3a-3d show how such a front light system is built in sequence. In FIG. 3a, two cathode electrodes (33) on a transparent substrate layer (31) are shown as column electrodes. In FIG. 3b, OLED light sources (32) are printed on the column electrodes (33). In FIG. 3c, anode electrodes (34) in rows are placed over the OLED light sources (32). It is preferred that the OLED light sources are slightly larger than the actual overlapping areas of the cathode and anode electrodes to avoid any direct contact between the two electrodes. In FIG. 3d, a light shield film (35) is on top of the anode electrodes to block the OLED light from directly shining into the eyes of a viewer.

If the electrode strips are transparent, they usually are formed from ITO, a conducting polymer or other transparent conductive materials.

The electrode strips may be applied by any of the conventional methods used to deposit a conductive material on a surface, such as patterned printing, shadow mask, sputtering, vapor deposition, vacuum deposition, electroplating, electroless plating, electroforming or thin film deposition with photoresist patterning.

All the column (cathode) electrodes are driven simultaneously at one potential and all the row (anode) electrodes are driven simultaneously at another potential, thus creating a voltage difference between the two electrodes to generate a current which flows through the OLED light material to cause all of the OLED light sources to emit light.

In FIG. 3, the column electrodes (33) are underneath the OLED light sources whereas the row electrodes (34) are above the OLED light sources. It is also possible to have the row electrodes (34) to be underneath the OLED light sources (32) and the column electrodes (33) to be above the OLED light sources. Either the cathode electrode or the anode electrode may be underneath the OLED light source and the other above the OLED light source. In any case, the electrodes between the transparent substrate layer (31) and the OLED light sources (32) are transparent.

The electrode strips on top of the OLED light sources may be non-transparent. In this case, in order to ensure a sufficiently large transparent area in the front light system, the opaque electrode area is to be kept at a small fraction of the total surface area. The operation of the front light system with non-transparent electrodes is the same as that of FIG. 3.

Figure 4:
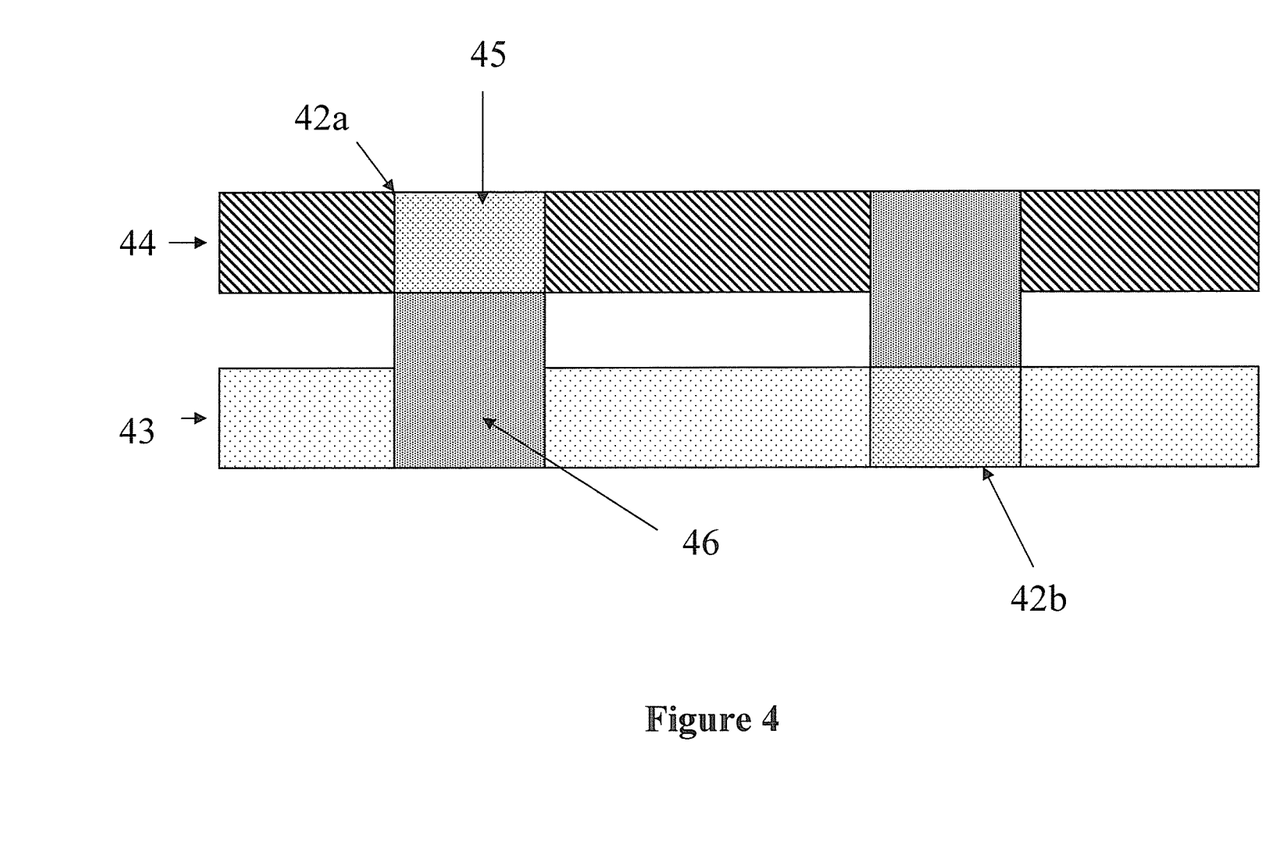
FIG. 4 depicts a top view of an alternative design of the front light system of the present invention.

FIG. 4 is a top view of an alternative design. In FIG. 4, the electrodes are arranged in a co-linear fashion. The cathode electrodes (43) and anode electrodes (44) are arranged in parallel. A conductive bridge (46) contacts the cathode (43) and is then formed laterally to overlap the OLED (42a) which is on top of the anode (44). Since FIG. 4 is a top view, the OLED light source (42a) placed between the anode (44) and the conductive bridge (46) can not be seen. In this case, the voltage difference between the cathode and the anode generates a current which causes the OLED light source (42a) to emit light. Other OLED light sources (such as 42b) may be similarly configured. On top of each OLED light source, there is a light shield (45) if the electrode layer on top of the OLED light sources (42a and 42b) is transparent.

Figure 5A:
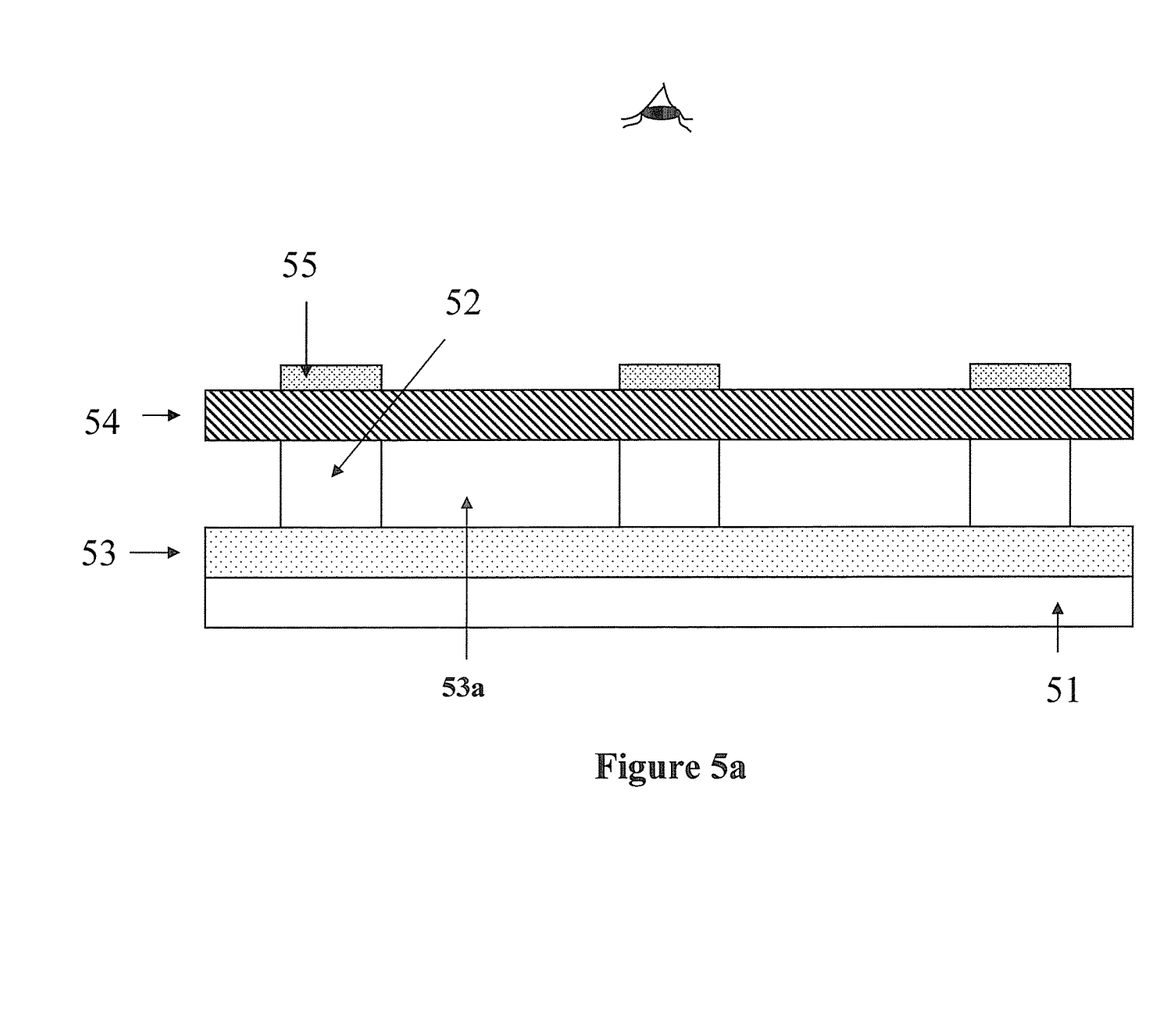
FIGS. 5a and 5b depict a further alternative design of the front light system.
Figure 5B:
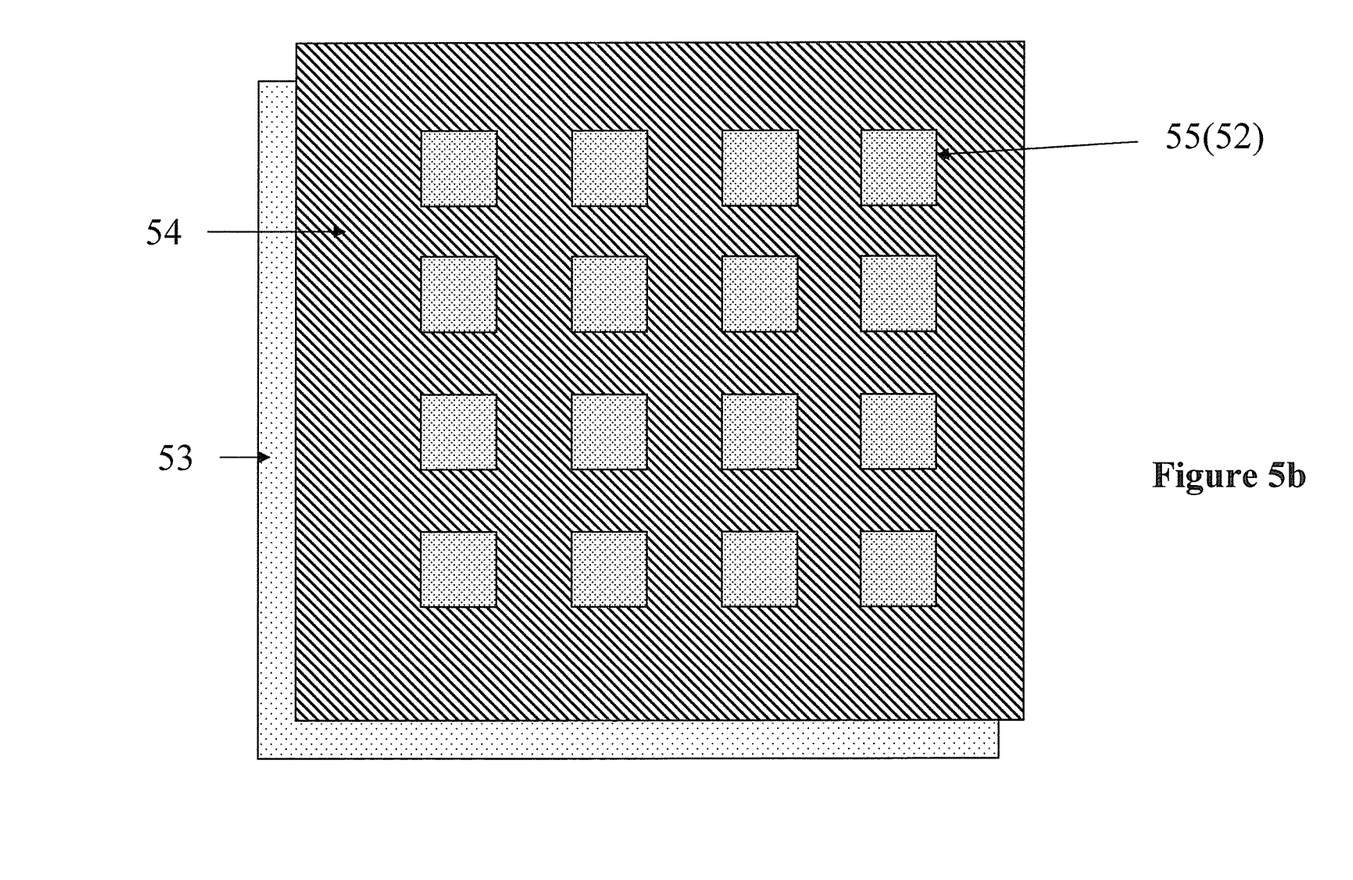

FIG. 5a illustrates a further alternative design of the front light system, in a cross-section view. In this design, the cathode and anode electrodes are in the form of layers. In other words, the electrode layers are not patterned. The cathode electrode layer (53) is on a transparent substrate layer (51). As shown in the figure, multiple OLED light sources (52) are sandwiched between the cathode and anode electrode layers (53 and 54). An insulating layer (53a) may be present between the cathode and anode layers to prevent direct contact between the two electrode layers where no OLED light sources are present. Such a structure is easer to assemble; but requires better control of defect density to avoid layer to layer shorts. A light shield (55) is on top of each OLED light source (52) if the electrode layer on top of the OLED light sources is transparent. FIG. 5b is a top view of the front light system of FIG. 5a.

FIGS. 3-5 only demonstrate a few examples of electrode configurations which may be implemented for the present invention. Many other comparable electrode configurations which are not specifically described may also be utilized and all of those are encompassed within the scope of the present invention.

Figure 6:
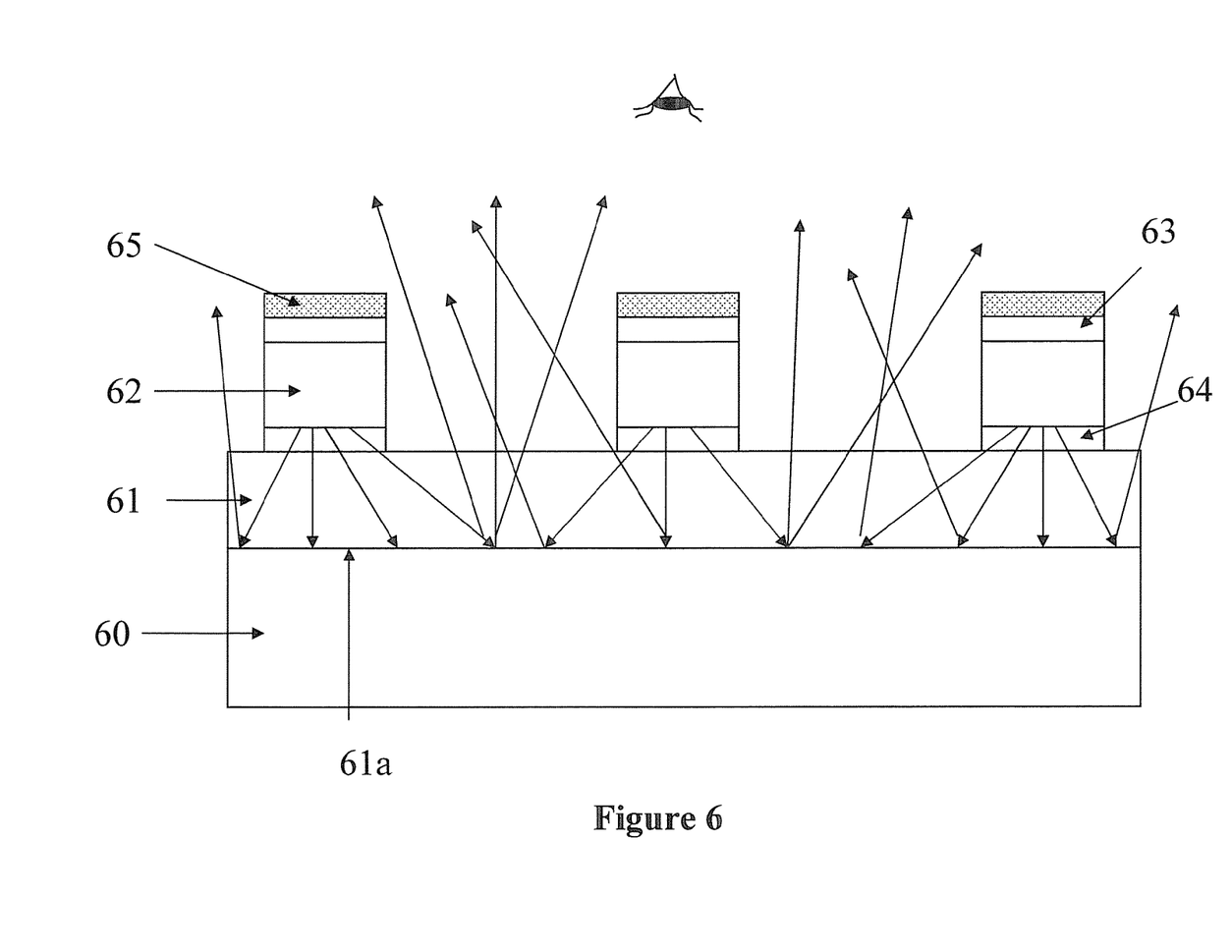
FIG. 6 illustrates how a front light system of the present invention is integrated with a reflective display.

FIG. 6 illustrates how a front light system of the present invention is integrated with a reflective display (60). In this figure, the OLED light sources (62) formed on a transparent substrate layer (61) are sandwiched between two electrodes (63 and 64). Light shields (65), if present, are also shown to be on top of the OLED light sources. The light emitted by the OLED light sources strikes a reflective surface (61a) of the reflective display (60) through the transparent electrodes (64) and the transparent substrate layer (61) and is then reflected and scattered. The reflected and scattered light brightens the viewing surface of the display, thus facilitating viewing of the images displayed by the reflective display. The presence of the light shield film (65) for each light source (62), as stated above, blocks the light emitted from the light source from directly reaching the observer, creating a more uniform and soothing lighting condition.

The front light system of the present invention is suitable for all types of reflective displays. One of the examples is demonstrated in FIGS. 7a, 7b and 7c.

Figure 7A:
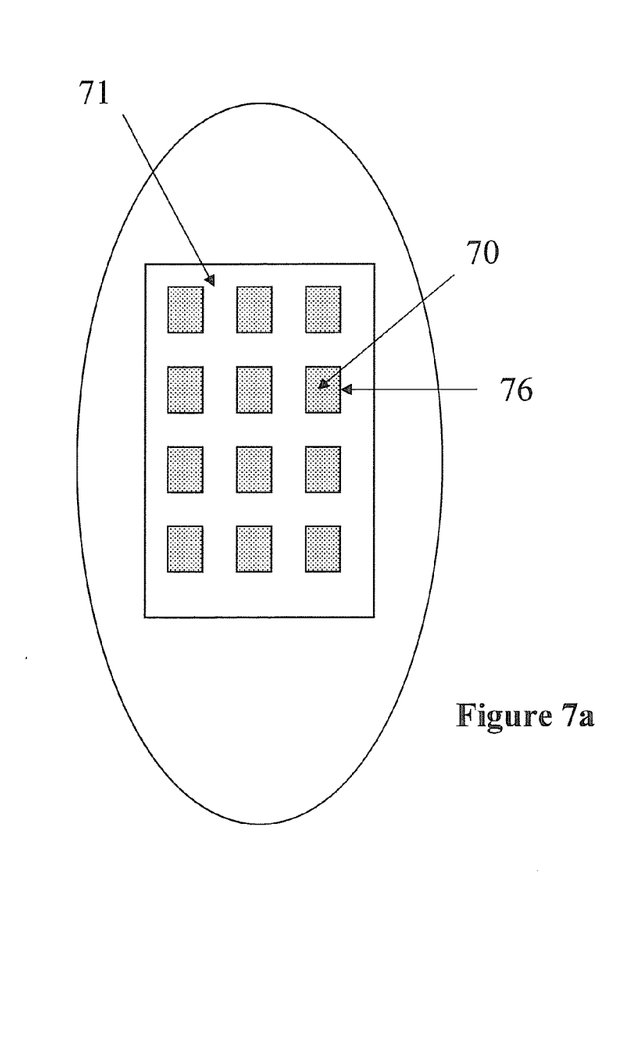
FIGS. 7a-7c demonstrate how a front light system of the present invention is incorporated into a keymat application.

FIG. 7a is a top view of a keymat assembly which may be used in a device such as a cell phone. The keymat (71) has keys (76) (or buttons) on its top surface. A reflective display (70) is overlaid on the keys (76) and it can display visually viewable information, such as alphabets, numbers or operational commends. The areas between the keys may also be covered by a reflective display.

Figure 7B:
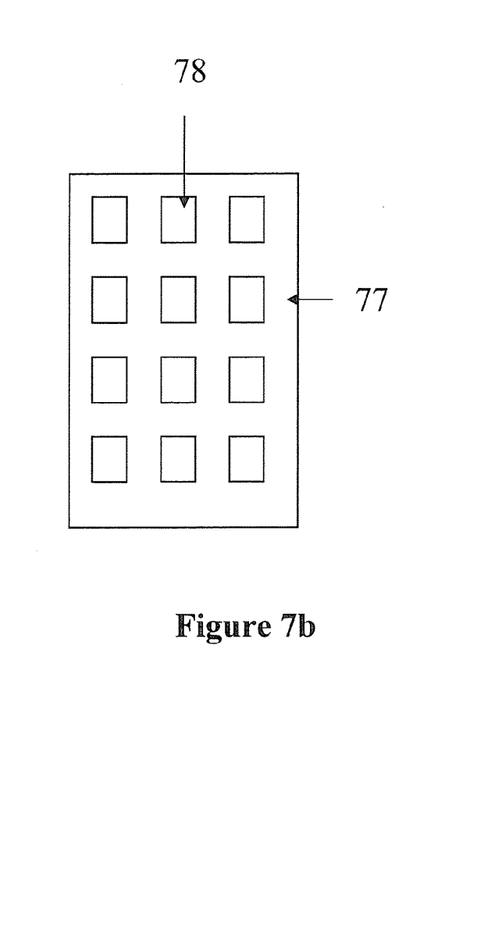

FIG. 7b is a top view of a front light film (77) of the present invention. The OLED light sources are embedded in the film except the transparent areas (78). The transparent areas (78) correspond to the keys (76) on the keymat.

The front light film (77) is then placed over (e.g., laminated over) the keymat (71). The reflective display produces images to be shown on the keys and the images are visible through the transparent areas (78) of the front light film (77). The light generated by the OLED light sources shines sideways onto the keys and illuminates them when required.

In this case, since the active display is only over the keys, the LED material may be one uniform layer filling all of the areas on the front light film (77), except the transparent areas (78).

Figure 7C:
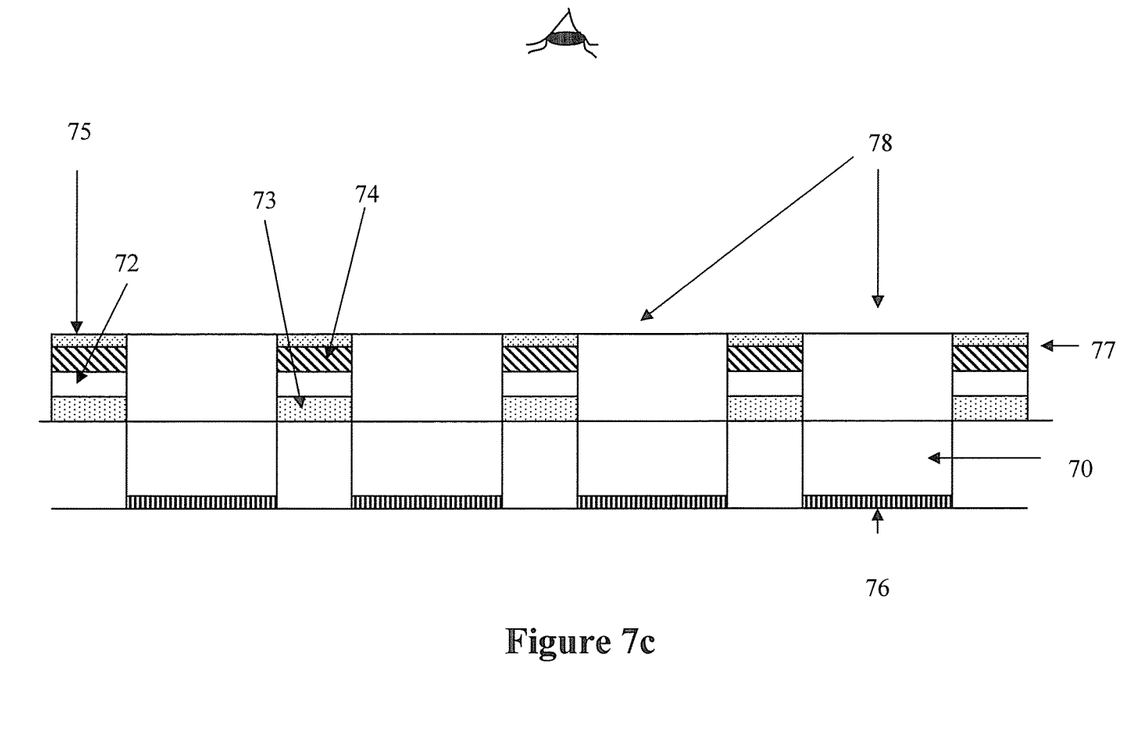

FIG. 7c is a cross-section view of a keymat assembly with a front light system of the invention. A reflective display (70) is on top of the touch sensitive keys (76). A front light film (77) is placed over the reflective display (70) with the transparent areas (78) corresponding to the keys (76) to allow the images displayed on the keys to be seen through the transparent areas (78). The front light film, as shown, has electrodes (73 & 74), OLED light sources (72) and light shield film (75), if present.

The front light film (77) may be formed using a shadow mask. While less preferably, the transparent areas on the front light film (77) may also be formed by creating openings on a complete sheet of front light film, using die punch, laser cutting or other similar methods.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the improved driving scheme for an electrophoretic display. Accordingly, the present embodiments are to be considered as illustrative and not restrictive, and the invention is not to be limited to the details given herein, but may be modified within the scope and equivalents of the appended claims.

What is claimed is:

1. A keymat assembly comprising
   a) touch sensitive keys;
   b) reflective displays overlaid on said touch sensitive keys, wherein each of said reflective displays comprises a display film sandwiched between a first transparent electrode on a viewing side and a second electrode; and
   c) a front light film comprising:
      i) one or more light emitting sources, each of which is sandwiched between a cathode and an anode and said cathode and said anode enable driving of said light emitting source to emit light sideways onto the touch sensitive keys; and
      ii) transparent areas; wherein only the transparent areas are on top of the reflective displays to allow images displayed by the reflective displays on said touch sensitive keys to be seen through the transparent areas.

2. The keymat assembly of claim 1, wherein each of said light emitting sources further comprises a light shield film.

3. The keymat assembly of claim 1, wherein said light emitting source is a light emitting diode.

4. The keymat assembly of claim 3, wherein said light emitting diode is an organic light emitting diode.

5. The keymat assembly of claim 3, wherein said light emitting diode is an inorganic light emitting diode, an electroluminescent emitter, or UV phosphor.

6. A cell phone comprising the keymat assembly of claim 1.

* * * * *